United States Patent Office 3,585,039
Patented June 15, 1971

3,585,039
SILVER HALIDE EMULSION CONTAINING YELLOW BENZOTHIAZOLE AZO DYES USEFUL IN THE SILVER DYE BLEACHING PROCESS
Karlheinz Kabitzke, Cologne-Buchheim, Erich Bockly, Leverkusen, Steinbuchel, Justus Danhauser, Cologne-Stammheim, Karl-Heinz Freytag, Leverkusen, and Hans Vetter, Cologne-Stammheim, Germany, assignors to Agfa-Gevaert Aktiengesellschaft, Leverkusen, Germany
No Drawing. Filed Mar. 4, 1969, Ser. No. 804,255
Claims priority, application Germany, Mar. 8, 1968,
P 16 22 923.5
Int. Cl. G03c 1/10
U.S. Cl. 96—99     6 Claims

ABSTRACT OF THE DISCLOSURE

Silver halide emulsion containing yellow benzothiazole azo dyes to be used in the silver dye bleach process.

---

This invention relates to color photographic materials for use in the silver dye bleaching process which contain exceptionally light-fast yellow azo dyes.

The production of color photographic images by the silver dye bleaching process is known. In this process, the dye which is present in those areas of a homogeneously colored colloidal layer where a silver image has previously been produced photographically is bleached imagewise in a strongly acid bleaching bath. The dye used is usually an azo dye. If direct positive images or duplicate positives are to be produced from diapositives, simple black-and-white development is used to produce the silver image which is then a negative of the original. The image dye homogeneously distributed in the layer, or in the case of a multicolor material in the three layers, is destroyed where the silver image has been formed. Hence, as final result the desired dye image is obtained which is a positive of the original. If a silver image which is a positive of the original is produced, e.g. by black-and-white reversal development or by the bromine ion diffusion process or the silver salt diffusion process, a dye image is obtained which is opposite in gradation to the original, i.e. in this case a positive color image is produced after dye bleaching if the original is a color negative.

The dyes for use in this process must satisfy particularly stringent requirements. This is because these dyes must be spectrally suitable, must be well bleachable, and must have high fastness to light. Furthermore, the dyes must not impair the qualities of the photographic emulsion and they must be completely diffusion-fast in gelatin, which is almost exclusively used as the layer forming substance. However, the dyes must be readily soluble so that sufficiently concentrated solutions such as are required for modern casting processes may be easily prepared. The behaviour of the dyes in the silver halide emulsion is also very important. Thus, for example, they must not alter the viscosity of the casting solution even if left to stand for prolonged periods. High fastness to light as well as resistance to acid gases such as occur, for example in the atmosphere of industrial areas, are also particularly important. For thes reasons, the dyes previously described for the silver dye bleaching process are only of limited usefulness.

It is the object of the invention to find yellow azo dyes for use in the silver dye bleaching process which are easy to prepare, are compatible with the photographic layers, e.g. are readily soluble, and have little influence on the viscosity of the casting solution, and have spectral properties which meet the requirements of the photographic process.

It has now been found that light-sensitive photographic materials which comprise at least one silver halide emulsion layer are eminently suitable for use in the silver dye bleaching process if they contain in the said emulsion layer an azo dye of the following formula which contains at least one sulfonic acid group:

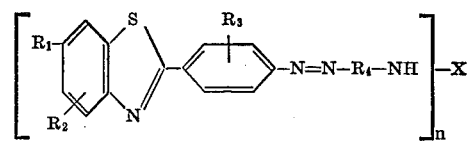

in which $R_1$ is hydrogen or alkyl, preferably containing up to 3 carbon atoms, e.g. methyl; benzothiazolyl, in particular alkyl-substituted benzothiazolyl, e.g. methylbenzothiazolyl;

$R_2$ and $R_3$ are hydrogen or sulfo;

$R_4$ is an arylene group, in particular phenylene or naphthylene, which group may be substituted by one or more substituents, e.g. by saturated or olefinically unsaturated aliphatic groups, preferably containing up to 5 carbon atoms, e.g. methyl, which aliphatic groups may in turn carry substituents, e.g. carboxyl or sulfonic acid groups, other suitable substituents being halogen, e.g. chlorine or bromine, alkoxy having preferably up to 5 carbon atoms, e.g. methoxy or ethoxy, amino or substituted amino, e.g. alkyl amino or acyl amino, especially sulfobenzoylamino; sulfo and carboxyl;

X is a monovalent or divalent radical which is preferably derived from an aliphatic or aromatic mono- or dicarboxylic acid, a particularly suitable monovalent acyl radical being benzoyl or substituted benzoyl and a suitable divalent acyl radical being (1) carbonyl, (2) the radical of a saturated or unsaturated aliphatic dicarboxylic acid preferably containing up to 12 carbon atoms, such as —COCH=CHCO—, —CO(CH$_2$)$_2$CO— or —CO(CH$_2$)$_4$CO— or (3) the radical of an aromatic dicarboxylic acid, especially a benzene dicarboxylic acid such as isophthalic acid or terephthalic acid; also pyridine dicarboxylic acid or furan dicarboxylic acid;

$n$ is 1 or 2.

The following are examples of dyes which have proved to be suitable:

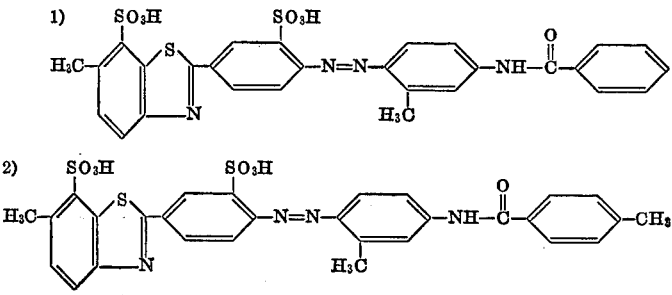

3)
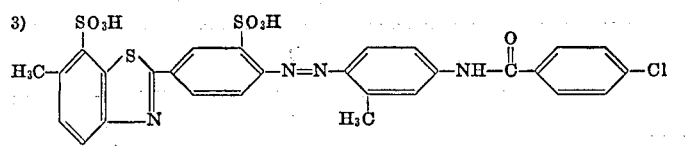
4)
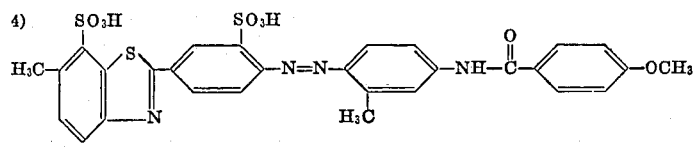
5)
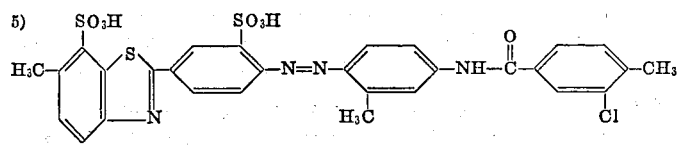
6)
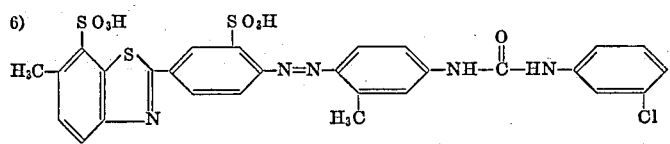
7)
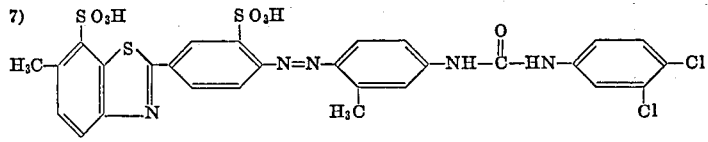
8)
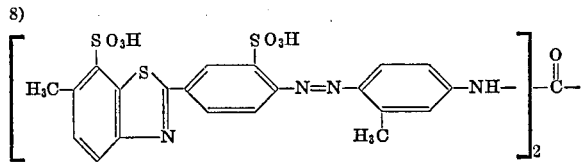
9)
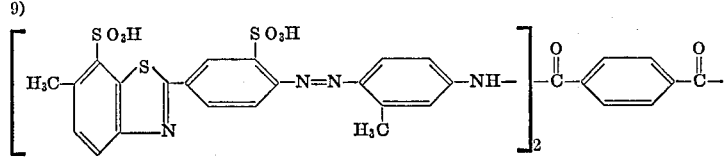
10)
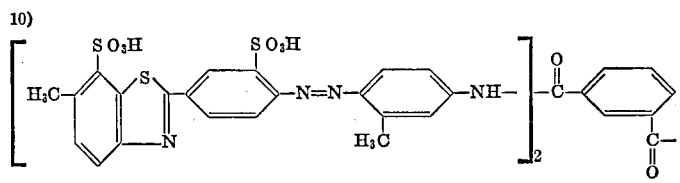
11)
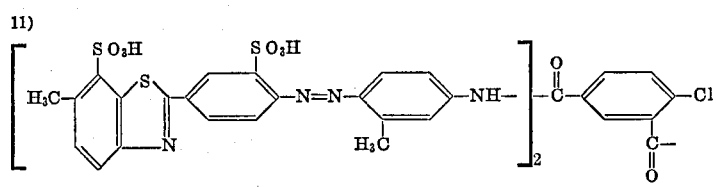
12)
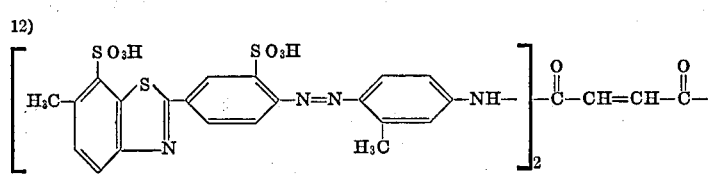
13)
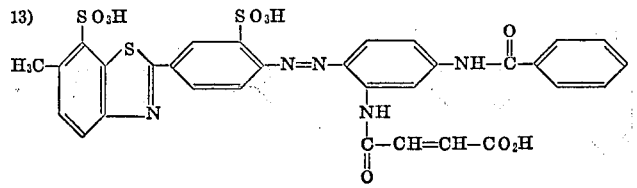

14) 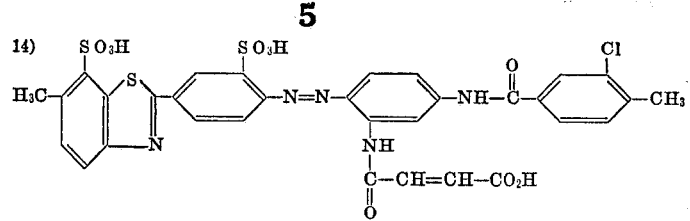
15) 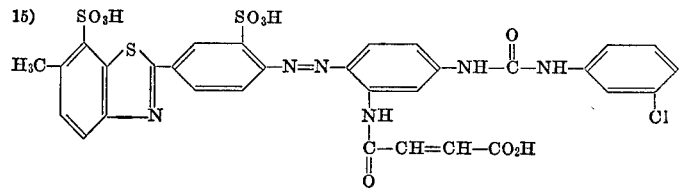
16) 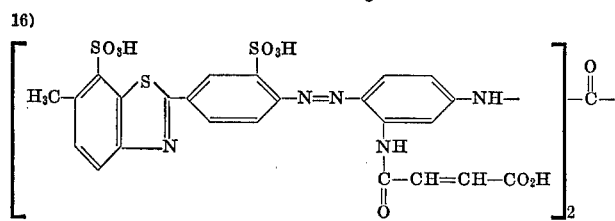
17) 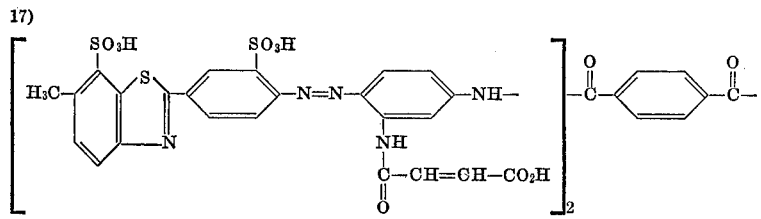
18) 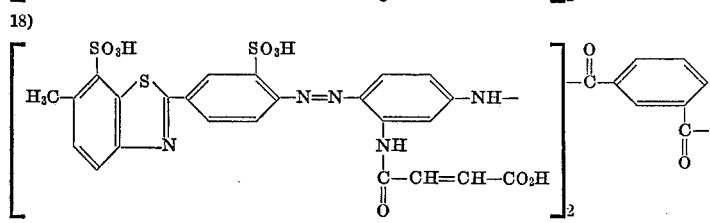
19) 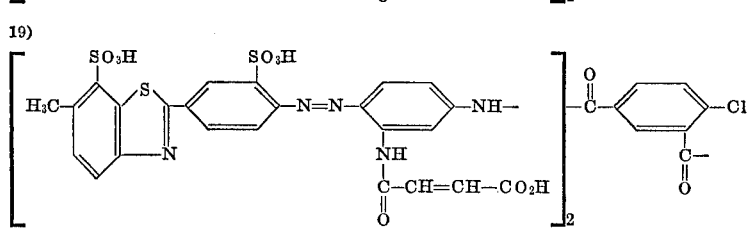
20) 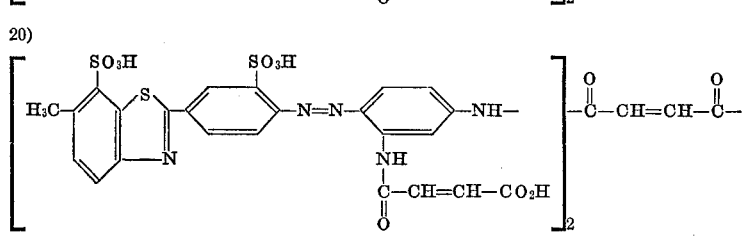
21) 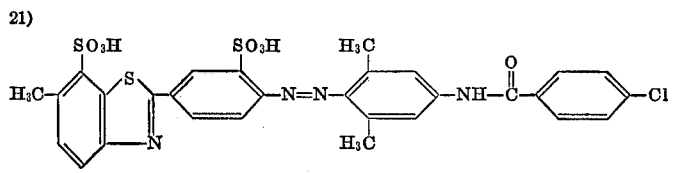
22) 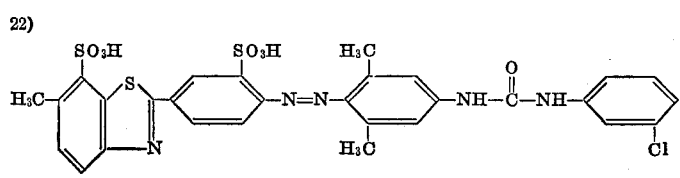

23) 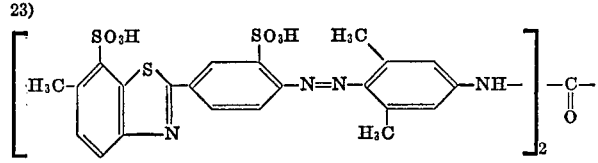
24) 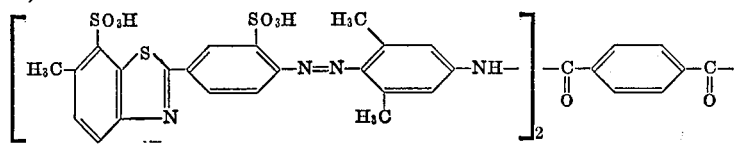
25) 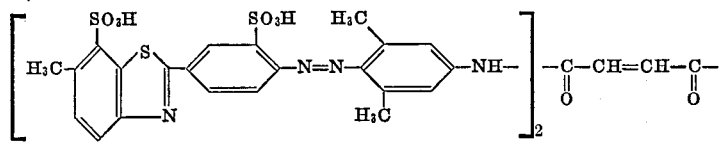
26) 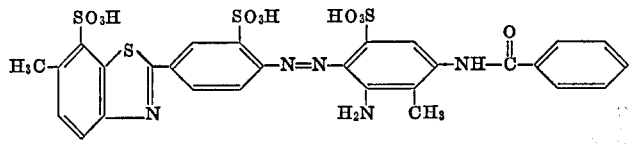
27) 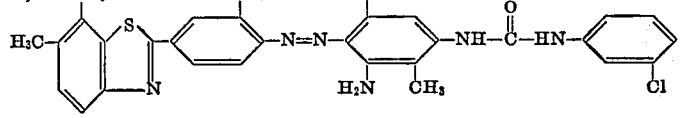
28) 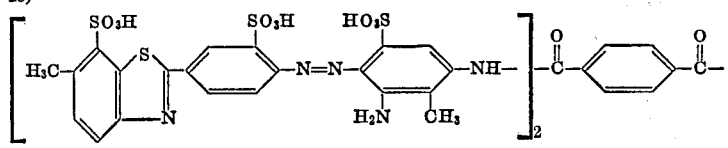
29) 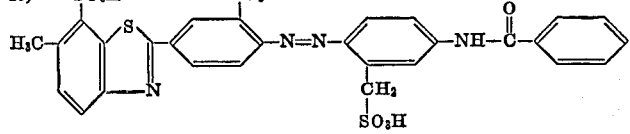
30) 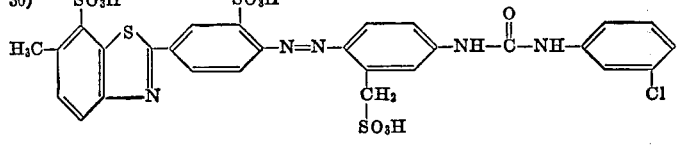
31) 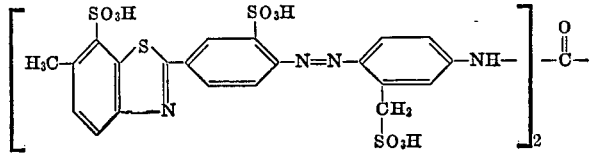
32) 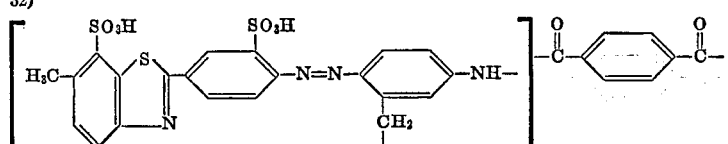
33) 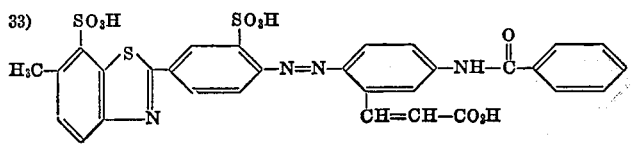

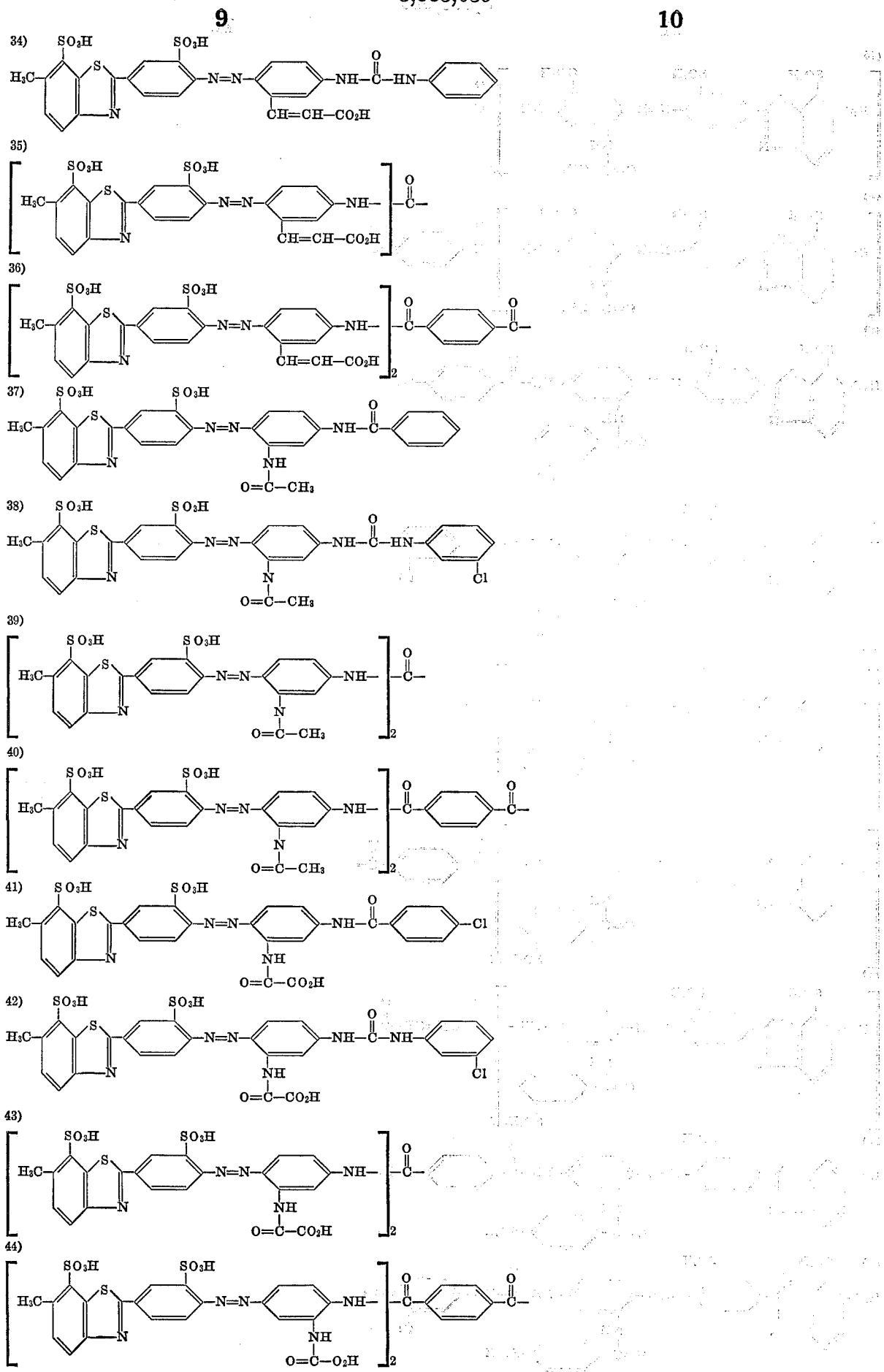

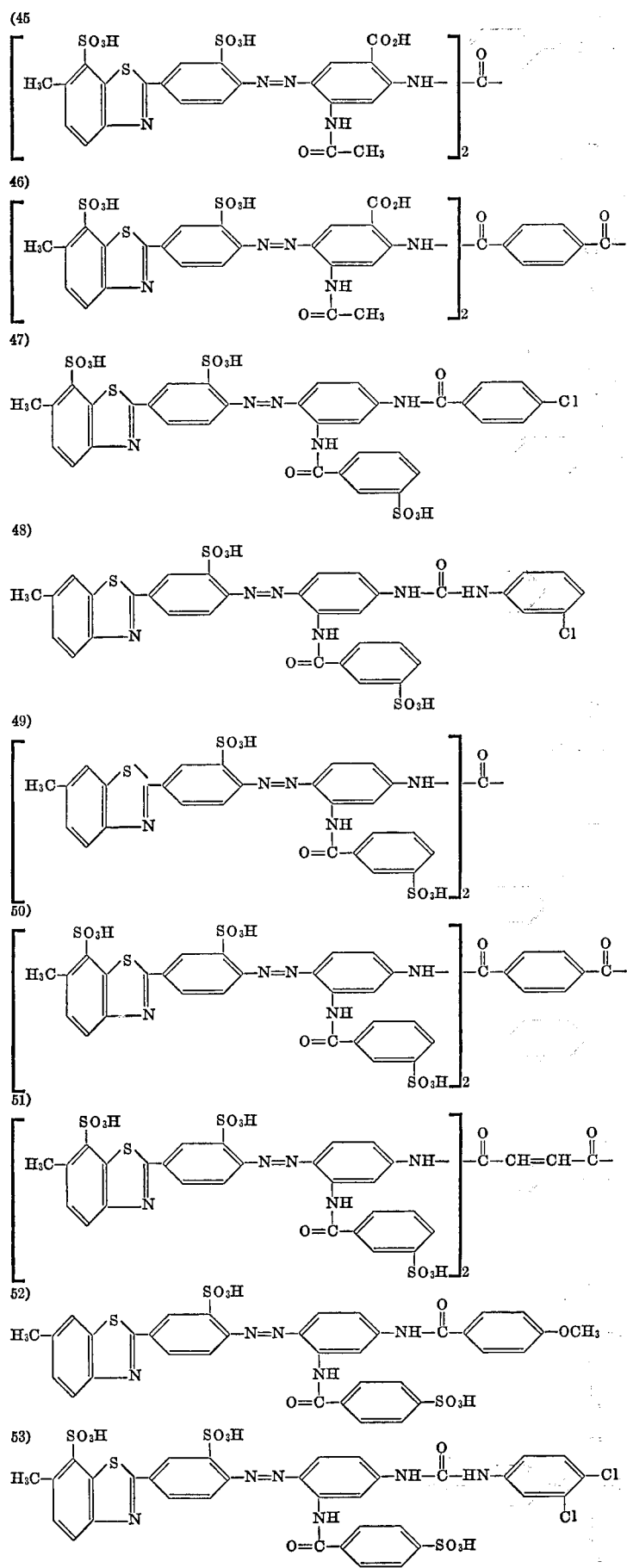

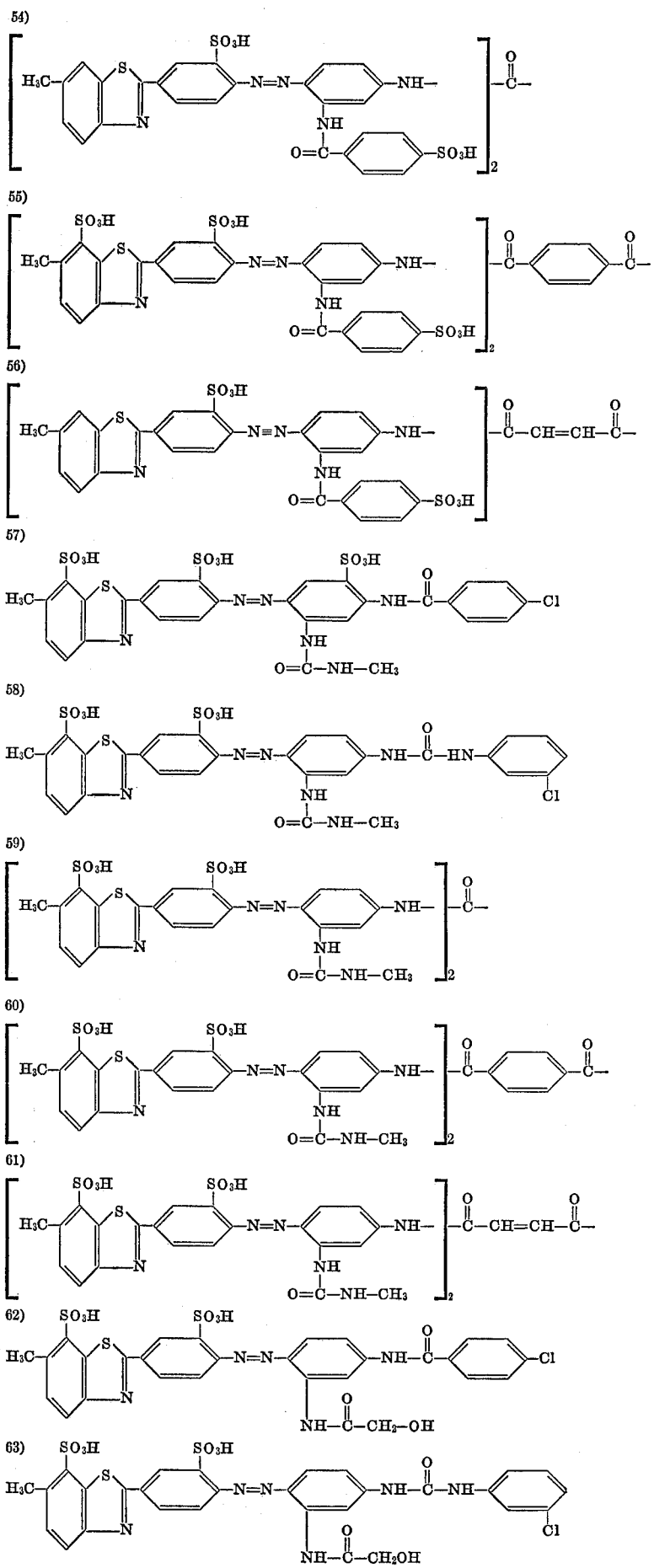

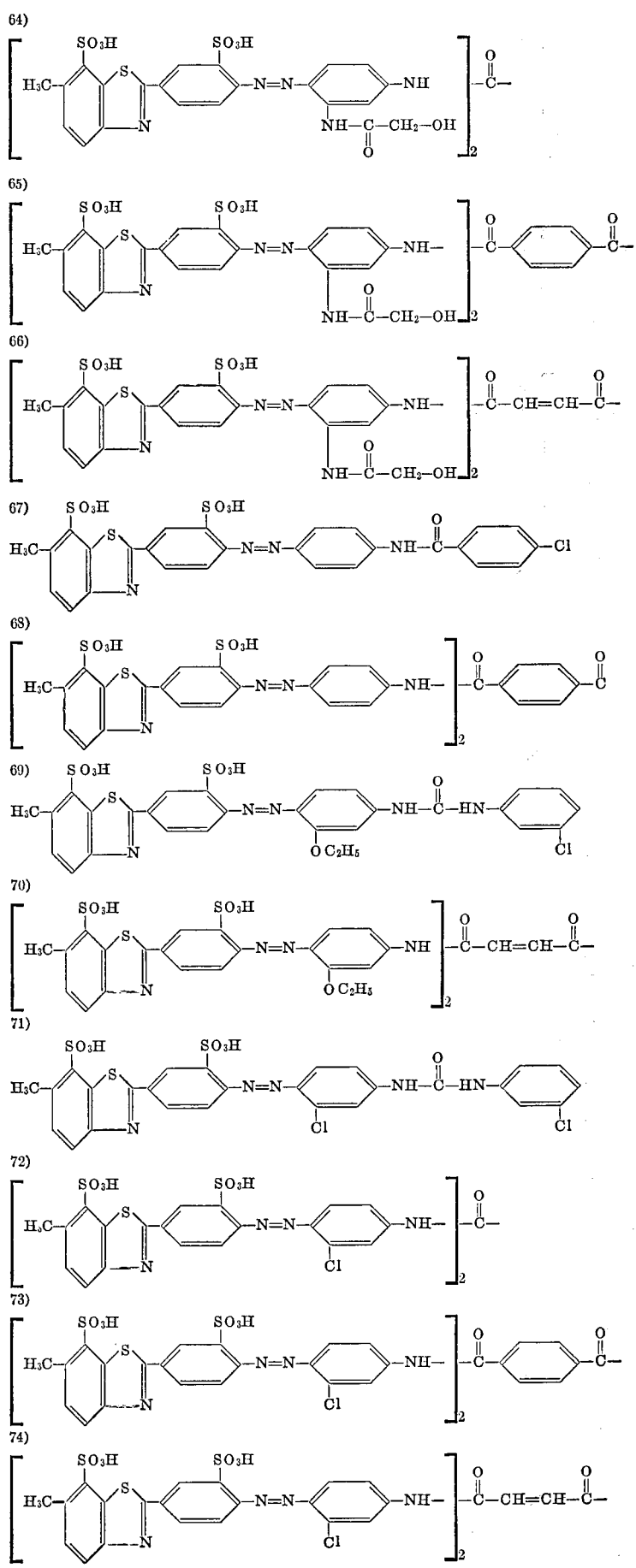

75) 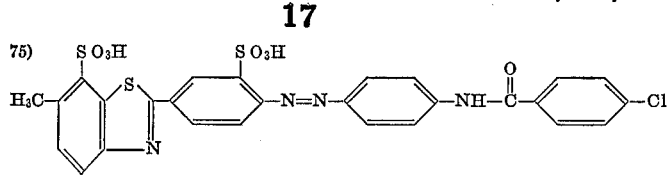
76) 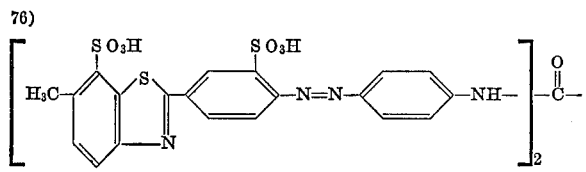
77) 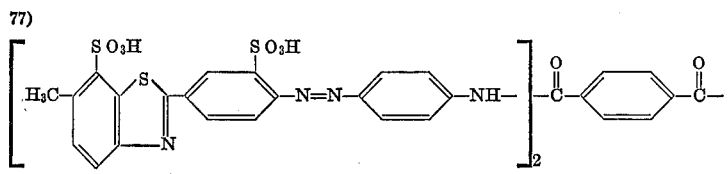
78) 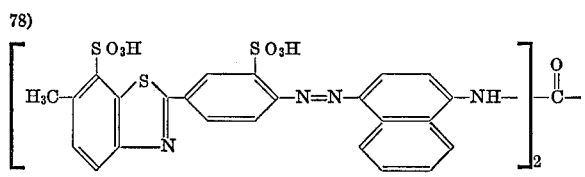
79) 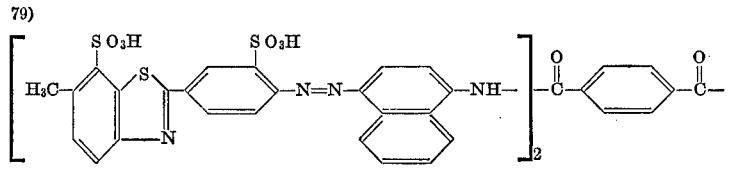
80) 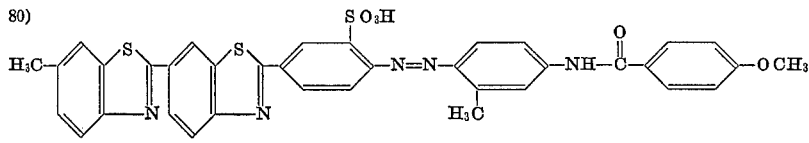
81) 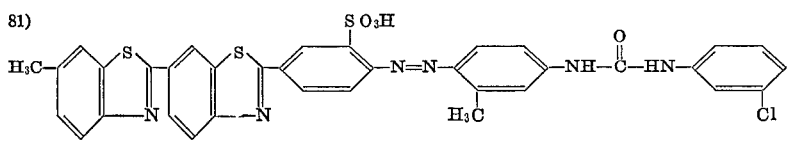
82) 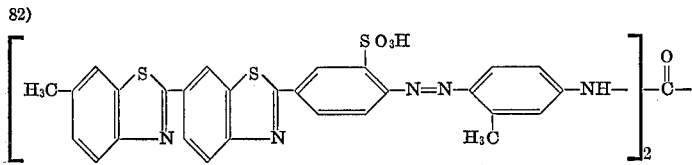
83) 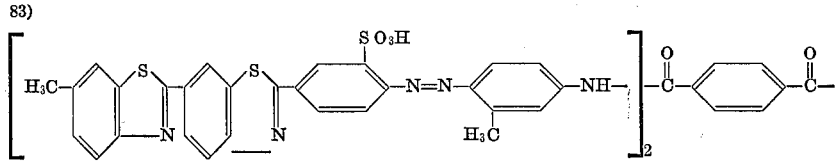
84) 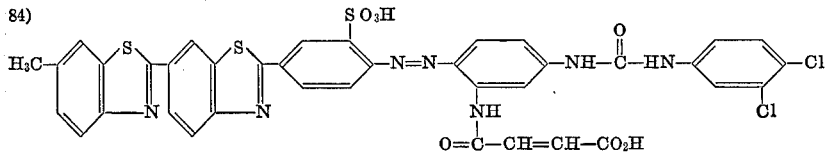
85) 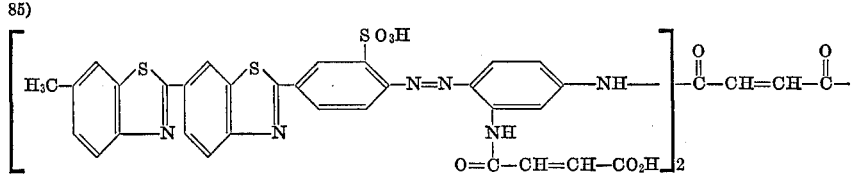

86) 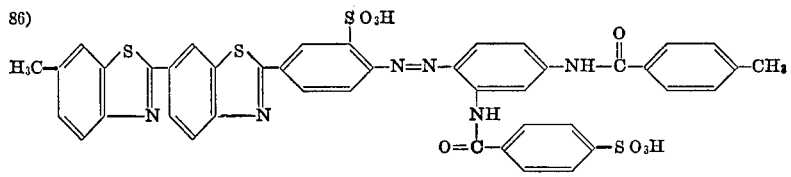

87) 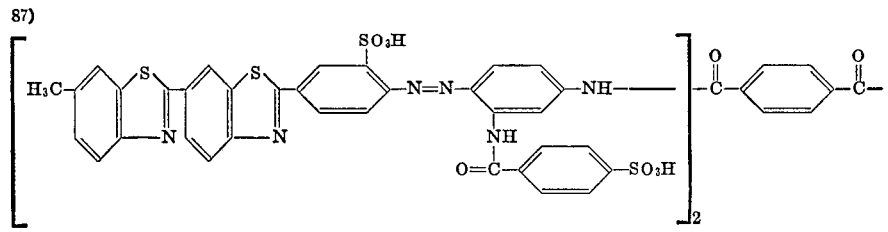

88) 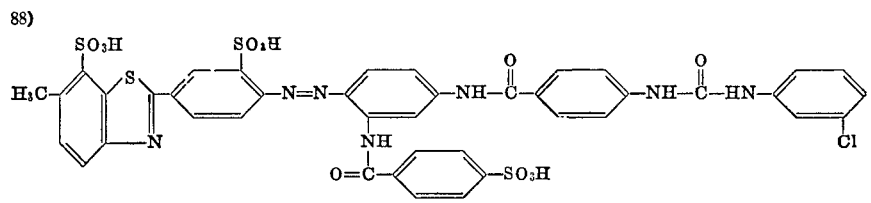

89) 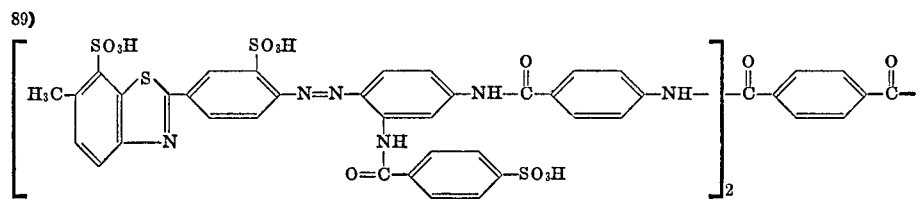

90) 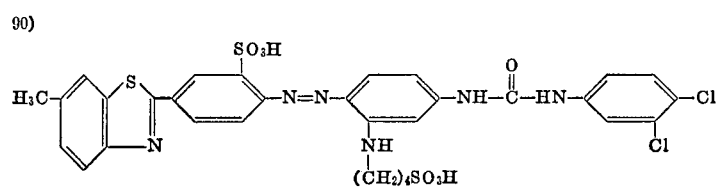

91) 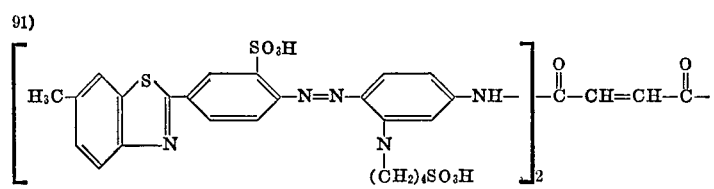

The dyes for use according to the invention are prepared by methods usual in azo dye-chemistry.

DYE NO. 8

7-sulfo-6-methyl-2-(4-amino - 3-sulfophenyl) - benzothiazole is indirectly diazotised and coupled under acid conditions with 3-methylaniline. The isolated coupling product is dissolved in water and phosgenated in the usual manner to produce the final dye.

DYE NO. 17

7-sulfo-6-methyl-2-(4-amino - 3-sulfophenyl) - benzothiazole is indirectly diazotised and coupled under acid conditions with 3-maleoylamino-aniline. The isolated coupling product is reacted in the usual way with terephthalic acid dichloride to produce the final dye.

One special advantage of these dyes over other known yellow azo dyes is the ease with which they can be prepared, since the aminophenylbenzothiazoles from which they are derived are very easily accessible in practice. They can therefore be prepared in a particularly pure state so that the undesirable effects or impurities are avoided. Their spectral properties as well as the brilliance of the dyes are excellent. They also have excellent compatibility with silver halide gelatin emulsions which makes them very valuable and very uniform distribution in the layer is achieved. It is, in particular, in this last property that many of the known dyes, which would otherwise be useful on account of their spectral properties, are not satisfactory.

Owing to their excellent light-fastness, ability to be bleached and diffusion fastness, the dyes according to the invention can be used in various ways in color photographic layers for the silver dye bleaching process. As will be shown in the following examples they are used to particular advantage as image dyes in layers which are subjected to a simple black-and-white negative development and accordingly yield direct positive color images in the subsequent dye bleaching bath. They may also be used for a black-and-white reversal development, in which case dye images which are opposite in gradation to the original are obtained after the layers have been processed in the treatment baths of the silver dye bleaching process. Such images are required for the production of positive colored prints or transparencies from color negatives.

The dyes mentioned above are substantially inert to the usual quantities of emulsion additives such as stabilisers, plasticisers, wetting agents, hardness and other substances, e.g. added sensitisers.

As will be shown in the following example, they can be bleached completely to pure white in various bleaching baths, e.g. in those based on quinoline and iodide or on thiourea and different bleaching catalysts such as quinoline, quinoxaline, phenazine derivatives and the like and therefore leave virtually no colored fog.

The dyes for use according to the invention are added in the usual manner to silver halide emulsions which may contain silver chloride, bromide or mixtures thereof, if desired, with silver iodide. Color photographic layers produced with these dyes can be cast on supports made of paper, baryta paper, polyethylene-coated paper, polypropylene-coated paper or on paper which has been rendered hydrophobic in some other way, glass, metallised foils of all types or transparent or pigmented cellulose acetates as well as on transparent or pigmented substrated foils of polyester, etc. Apart from their use as image dyes, for the silver dye bleaching process, the dyes according to the invention are also very suitable for the production of filter layers for photographic purposes on account of their high fastness to light and their spectral properties.

EXAMPLE 1

4.5 g. of the dye of Formula 8 are dissolved in 400 ml. of 4% gelatin solution with 0.7 g. of saponine, and 800 ml. of a melted silver bromide gelatin emulsion are added. After the addition of 20 ml. of a 1% aqueous solution of N,N',N''-tris-acryloylhydrotriazine-(1,3,5) as hardener, the emulsion is cast on a layer support of baryta paper and on another support of cellulose triacetate in a layer thickness which corresponds to a silver application of 0.6 to 0.9 g. of silver per m.$^2$, and the layers are dried. A strip of each material prepared as described above is exposed behind a grey step wedge with yellow or white light and is worked up as follows:

(1) Development: 5 minutes in the following developer:

p-methylaminophenol—1 g.
hydroquinone—3 g.
sodium sulphite anhydrous—13 g.
sodium bromide—1 g.
soda anhydrous—26 g.
water—up to 1000 ml.

(2) Wash: 5 minutes.
(3) Fix: 5 minutes in the following bath:

sodium thiosulphate cryst—200 g.
potassium metabisulphate—20 g.
water—up to 1000 ml.

(4) Wash: 5 minutes.
(5) Harden: 5 minutes in the following bath:

formalin (30%)—100 ml.
sodium bicarbonate—2 g.
water—up to 1000 ml.

(6) Wash: 5 minutes.
(7) Dye-bleach: 10 minutes in the following bath:

potassium iodide—10 g.
sodium hypophosphite—10 g.
conc. sulphuric acid—75 ml.
quinoline—50 ml.
water—up to 1000 ml.

(8) Wash: 5 minutes.
(9) Bleach-fix: 10 minutes in the following bath:

tetrasodium-ethylene diaminotetraacetate—26 g.
soda anhydrous—24 g.
ferric chloride—15 g.
sodium sulphite, anhydrous—13 g.
sodium thiosulphate—200 g.
water—up to 800 ml.

(10) Wash: 15 minutes.

After drying, pure yellow dye wedges with excellent gradation, high brilliance and good whites are obtained which do not show any signs of dye diffusion and have excellent fastness to light. The layers are very suitable for the production of the yellow part of the image in a multicolor photographic material.

EXAMPLE 2

A multi-layered color photographic material for the silver dye bleaching process is prepared as described below. The following layers are cast sucessively on a support of baryta paper:

(1) A red-sensitized layer which contains, in 500 g. of an iodide-containing (5 mols percent) silver bromide emulsion, 12 mg. of the sensitizer according to Example 11 of German patent specification 1,177,481 and 2.7 g. of the dye of the following formula:

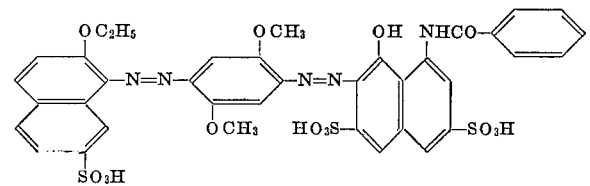

the preparation of which is described in French patent specification 1,471,787, dissolved in 200 ml. of a 2% gelatin solution which in addition contains 10 ml. of a 1% aqueous solution of N,N',N''-trisacryloyl-hexahydro-1,3,5-triazine as hardener and 0.5 g. of saponin. The amount of silver applied is 0.8 g. per m.$^2$.

(2) An intermediate layer of 2% gelatin solution.
(3) A green-sensitive layer which contains, per 500 ml. of an iodide-containing (5 mols percent) silver bromide emulsion, 15 g. of the sensitizer according to Example 2 of German patent specification 1,177,481 and 3.5 g. of the dye of the following formula:

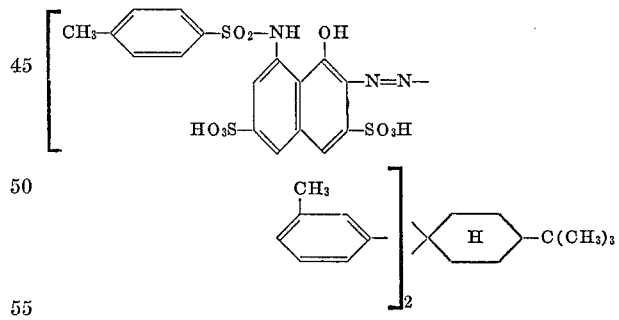

the preparation of which is described in German patent specification 1,039,840, dissolved in 200 ml. of a 2% gelatin solution which in addition contains 10 ml. of a 1% aqueous solution of N,N',N''-trisacryloyl-hexahydro-1,3,5-triazin as hardener and 0.4 g. of saponin. The silver application is 0.75 g. per m.$^2$.

(4) An intermediate layer of a 4% gelatin solution containing per litre 8 g. of tartrazine.
(5) A non-sensitized emulsion layer containing silver bromide as described in Example 1.
(6) A protective layer of 2% gelatin solution.

After drying, the layer is exposed behind a multicolored diapositive and worked up as described in Example 1, but the treatment time in the dye bleaching bath is increased to 15 minutes. If the sensitivities of the individual layers are correctly adjusted to each other, a faithful reproduction of the colors of the original is obtained after washing and drying.

We claim:
1. A light-sensitive color photographic material containing at least one silver halide emulsion which contains a yellow mono- or bisazo dye of the following formula:

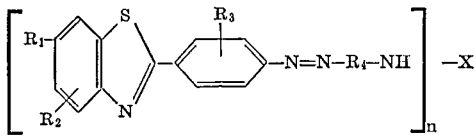

in which:
$R_1$ is hydrogen, alkyl or a benzothiazolyl group;
$R_2$ and $R_3$ are hydrogen or sulfo;
$R_4$ is an arylene group;
X is a monovalent or divalent acyl radical; and
$n$ is 1 or 2.

2. A light-sensitive color photographic material according to claim 1, wherein $R_1$ represents methyl and $R_2$ is sulfo in the 7-position.

3. A light-sensitive color photographic material according to claim 1, wherein $R_3$ denotes sulfo in the ortho-position to the azo group.

4. A light-sensitive color photographic material according to claim 1, wherein $R_4$ represents a phenylene group substituted with alkyl or acylamino.

5. A light-sensitive color photographic material according to claim 1, wherein X represents a divalent radical of a benzene dicarboxylic acid, of furmaric acid or —CO— and $n$ is 2.

6. A light-sensitive color photographic material according to claim 1, wherein the azo dye has the following formula:

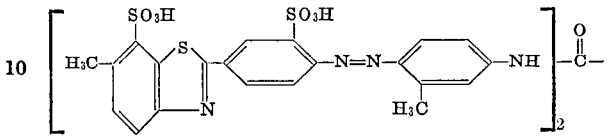

References Cited
UNITED STATES PATENTS 3,210,190 10/1965 Anderan et al. _____ 96—99
3,493,372 2/1970 Gompf et al. _____ 96—99

J. TRAVIS BROWN, Primary Examiner

U.S. Cl. X.R.

96—20, 73